United States Patent
Koh

(10) Patent No.: US 6,507,778 B2
(45) Date of Patent: Jan. 14, 2003

(54) APPARATUS FOR CONTROLLING SEMI-ACTIVE SUSPENSION SYSTEM

(75) Inventor: You-Seok Koh, Kyonggi-Do (KR)

(73) Assignee: Mando Corporation (KR)

( * ) Notice: Subject to any disclaimer, the term of this patent is extended or adjusted under 35 U.S.C. 154(b) by 183 days.

(21) Appl. No.: 09/755,808

(22) Filed: Jan. 5, 2001

(65) Prior Publication Data

US 2002/0133277 A1 Sep. 19, 2002

(51) Int. Cl.$^7$ .............................................. B60G 13/00
(52) U.S. Cl. ..................... 701/37; 280/5.506; 280/5.515
(58) Field of Search ............................. 701/37, 38, 39; 280/5.503, 5.508, 5.515, 5.519, 5.506

(56) References Cited

U.S. PATENT DOCUMENTS

| | | | |
|---|---|---|---|
| 4,953,089 A | * 8/1990 | Wolfe ........................... 701/37 |
| 4,970,645 A | 11/1990 | Adachi et al. |
| 5,062,657 A | * 11/1991 | Majeed .................... 280/5.503 |
| 5,088,760 A | * 2/1992 | Kakizaki et al. ......... 280/5.515 |
| 5,096,219 A | * 3/1992 | Hanson et al. ............ 280/5.508 |
| 5,193,845 A | 3/1993 | Yokote et al. |
| 5,235,529 A | * 8/1993 | Hanson et al. ................ 701/37 |
| 5,255,191 A | * 10/1993 | Fulks ....................... 280/5.515 |
| 5,277,281 A | 1/1994 | Carlson et al. |
| 5,360,089 A | 11/1994 | Nakamura et al. |
| 5,398,184 A | 3/1995 | Yamaoka et al. |
| 5,425,436 A | * 6/1995 | Teramura et al. ......... 280/5.515 |
| 5,533,597 A | * 7/1996 | Nezu et al. ............... 280/5.515 |
| 5,987,369 A | 11/1999 | Kwak et al. |
| 6,092,011 A | 7/2000 | Hiramoto |

FOREIGN PATENT DOCUMENTS

| | | |
|---|---|---|
| GB | 2279425 | 1/1995 |
| WO | 9907567 | 2/1999 |

* cited by examiner

*Primary Examiner*—Gary Chin
(74) *Attorney, Agent, or Firm*—Anderson Kill & Olick, P.C.

(57) ABSTRACT

An apparatus for controlling a semi-active suspension system of a vehicle including at least one shock absorber using magneto-rheological fluids. The shock absorber has a rebound valve and a compression valve which are configured such that damping forces of the shock absorber generated in rebound strokes and compression strokes being controlled independently. The apparatus comprises a normal driving control unit for determining a ride value ($S_{ride}$) and a filtered vehicular vertical velocity ($v_i$) based on a vertical vehicular acceleration, an anti-roll control unit for determining a roll value ($S_{roll}$) based on a velocity and a steering angle of the vehicle, and a damping force adjusting unit for controlling the rebound valve and the compression valve of the shock absorber based on the roll value ($S_{roll}$), the ride value ($S_{ride}$) and the filtered vehicular vertical velocity ($v_i$) under a predetermined condition.

18 Claims, 2 Drawing Sheets

APPARATUS FOR CONTROLLING SEMI-ACTIVE SUSPENSION SYSTEM

FIELD OF THE INVENTION

The present invention relates to an apparatus for controlling a semi-active suspension system; and, more particularly, to an apparatus for controlling a semi-active suspension system using a variable damping force type shock absorber, wherein the damping force characteristics in rebound strokes and in compression strokes are controlled independently by means of separate control valves and utilizing a magneto-rheological fluid.

BACKGROUND OF THE INVENTION

In a semi-active suspension system for a vehicle, damping forces of respective shock absorbers are controlled independently by measuring the behavior of respective wheels by using, for example, vertical acceleration sensors installed at respective portions of the vehicle body adjacent to the shock absorbers.

As a control method for such a semi-active suspension system, the so-called "sky-hook" method is usually employed. This control method works as follows: when the direction of a vehicular vertical velocity is upward with respect to a road surface, the damping force characteristic in rebound strokes becomes hard, i.e., the damping force becomes relatively large, whereas the damping force characteristic in compression strokes becomes soft, i.e., the damping force becomes relatively small; and when a direction of a vehicular vertical velocity is downward with respect to a road surface, the damping force characteristic in rebound strokes becomes soft or relatively small, while the damping force characteristic in compression strokes becomes hard or relatively large.

Conventionally, two types of shock absorbers are employed for the semi-active suspension system. One is a reverse type semi-active damper and the other a normal type semi-active damper. In a suspension system using the reverse type semi-active dampers, the "sky-hook" control method can be applied by measuring vehicular vertical velocities only. However, the suspension system using reverse type semi-active dampers cannot offer an anti-roll control for preventing rolling behavior which occurs when a vehicle is steering. On the other hand, a suspension system using the normal type semi-active dampers can adopt the "sky-hook" control method as well as prevent the rolling behavior. However, in this system, vertical velocities of axles as well as vehicular vertical velocities should be measured, requiring more sensors than the suspension system using the reverse type semi-active dampers.

In order to solve these problems, an apparatus and a method for controlling damping force characteristic of a vehicular shock absorber and two types of shock absorbers therefor have been disclosed in U.S. Pat. No. 6,092,011. In order to control the damping force characteristics of the shock absorbers, a first type shock absorber uses a control valve driven by a stepping motor while a second type shock absorber uses throttling mechanisms driven by solenoid valves. However, in such a configuration, the damping force characteristics do not change continuously and their response times are not fast enough, which give performance restrictions.

As a shock absorber which has continuous damping force characteristics and response times fast enough, magneto-rheological fluid dampers (MR dampers) have been proposed in U.S. Pat. No. 5,277,281. However, no control method is provided in this patent.

SUMMARY OF THE INVENTION

It is, therefore, an object of the present invention to provide an apparatus for controlling a semi-active suspension system using a variable damping force type shock absorber, wherein damping force characteristics in rebound strokes and in compression strokes are controlled independently and MR fluids are utilized.

In accordance with a preferred embodiment of the present invention, there is provided an apparatus for controlling a semi-active suspension system of a vehicle including at least one shock absorber using a magneto-rheological fluid. The shock absorber has a rebound valve and a compression valve which are configured such that damping forces of the shock absorber generated in rebound strokes and compression strokes are controlled independently of each other. The apparatus comprises a normal driving control unit for determining a ride value ($S_{ride}$) as well as a filtered vehicular vertical velocity ($v_i$) based on a vehicular vertical acceleration; an anti-roll control unit for determining a roll value ($S_{roll}$) based on a velocity and a steering angle of the vehicle; and a damping force adjusting unit for controlling the rebound valve and the compression valve of the shock absorber based on the roll value ($S_{roll}$), the ride value ($S_{ride}$) and the filtered vehicular vertical velocity ($v_i$) under a predetermined condition.

A shock absorber which has a configuration such as shown in FIG. 10(c) of U.S. Pat. No. 5,277,281 may be used for the apparatus for controlling a semi-active suspension system of the present invention.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Preferred embodiments of the present invention will now be described in detail with reference to the accompanying drawings.

Figure 1:
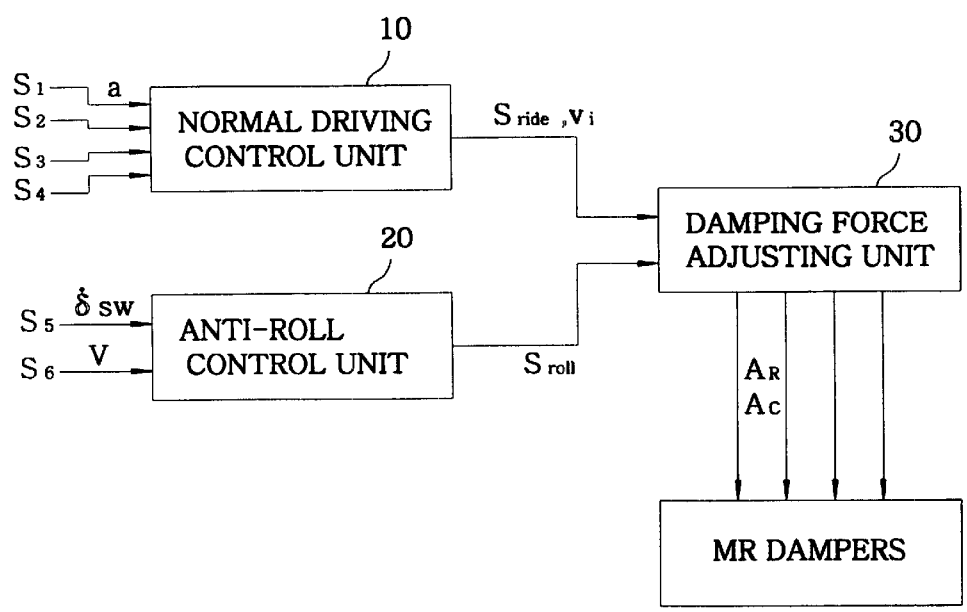
FIG. 1 shows a schematic block diagram of an apparatus for controlling a semi-active suspension system in accordance with a preferred embodiment of the present invention.

FIG. 1 shows a schematic block diagram of an apparatus for controlling a semi-active suspension system in accordance with a preferred embodiment of the present invention. As shown in FIG. 1, the apparatus for controlling a semi-active suspension system comprises a normal driving control unit 10, an anti-roll control unit 20, a damping force adjusting unit 30 and sensors S1–S6.

Figure 2:
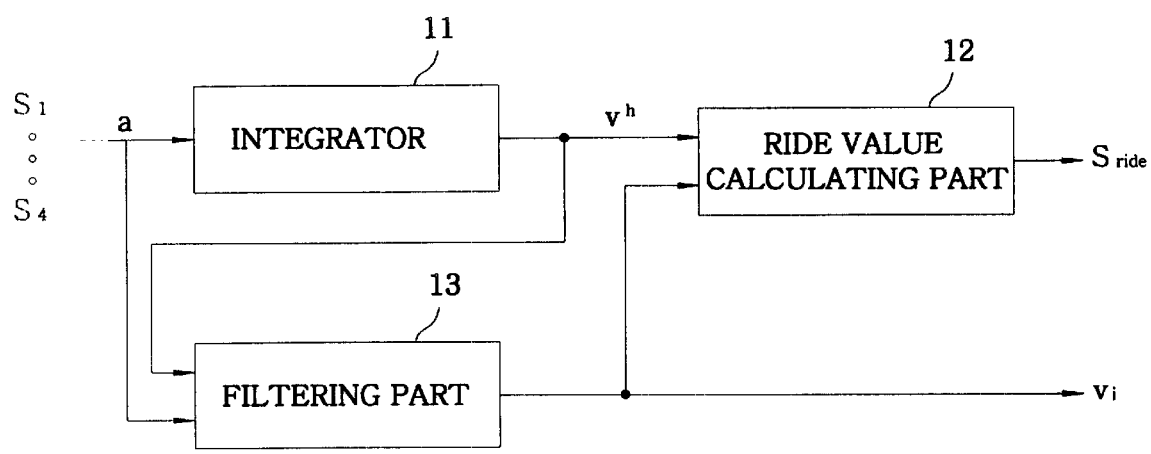
FIG. 2 illustrates a block diagram of the normal driving control unit shown in FIG. 1.

The normal driving control unit 10 includes an integrator 11, a ride value calculating part 12 and a filtering part 13, as shown in FIG. 2.

The integrator 11 is electrically connected to the vertical acceleration sensors S1, S2, S3 and S4 and receives vehicular vertical acceleration signals detected thereby. Vehicular vertical velocities $v^h$ are derived by performing integration in either z-domain or s-domain as follows:

$$\frac{v^h(z)}{a(z)} = \frac{0.00345z^2 - 0.00345}{z^2 - 1.969z + 0.96968} \quad (1z)$$

$$\frac{v^h(s)}{a(s)} = \frac{s}{s^2 + 2\zeta_1\omega_1 s + w_1^2} \quad (1s)$$

where $a(z)$ or $a(s)$ is the vehicular vertical acceleration.

During this process, low frequency components of the vehicular vertical acceleration signals are removed therefrom.

Next, powers of the respective vehicular vertical velocities are determined by calculating absolute values thereof and then filtering the absolute values through a low pass filter which has a cut-off frequency of 0.5 Hz as follows:

$$\frac{\overline{v}^h(z)}{v_p(z)} = \frac{0.01065z + 0.01065}{z - 0.97869}, \text{ where } v_p(z) = |v^h(z)| \quad (2z)$$

$$\frac{\overline{v}^h(s)}{v_p(s)} = \frac{1}{Ts+1}, \quad T = 0.325, \text{ where } v_p(s) = |v^h(s)| \quad (2s)$$

Further, the vehicular vertical acceleration signals are filtered through a band pass filter and filtered vehicular vertical velocities are determined as follows:

$$\frac{a^{10Hz}(z)}{a(z)} = \frac{0.11179z^2 - 0.11179}{z^2 - 1.6125z + 0.77642} \quad (3z)$$

$$a_{sq}^{10Hz}(z) = (a^{10Hz}(z))^2 \quad (4z)$$

$$\frac{\overline{a}_{sq}^{10Hz}(z)}{a_{sq}^{10Hz}(z)} = \frac{0.06195z + 0.06195}{z - 0.87611} \quad (5z)$$

$$\frac{a^{10Hz}(s)}{a(s)} = \frac{2\zeta_2\omega_2 s}{s^2 + 2\zeta_2\omega_2 s + \omega_2^2}, \quad \zeta_2 = 0.3, \omega_2 = 10 \times 2\pi \quad (3s)$$

$$a_{sq}^{10Hz}(s) = (a^{10Hz}(s))^2 \quad (4s)$$

$$\frac{\overline{a}_{sq}^{10Hz}(z)}{a_{sq}^{10Hz}(z)} = \frac{1}{Ts+1}, \quad T = 0.053 \quad (5s)$$

$$v_i = \frac{v^h}{1 + K_v \cdot \overline{a}_{sq}^{10Hz}} \quad (6)$$

where $K_v$ is a tuning variable, $v_i$ a filtered vertical velocity and the superscript 10 Hz bandwidth of a band pass 10 filter.

When the frequency of the vertical acceleration is high, the vehicular vertical velocity $v^h$ becomes relatively large and, when the frequency of the vertical acceleration is low, the vehicular vertical velocity $v^h$ becomes relatively small.

Then, ride value $S_{ride}$ is determined by the ride value calculating part 12 as follows:

$$S_{ride} = K_{ride\_reb} \times \overline{v}^h, \text{ when } v_i > 0 \quad (7)$$

$$S_{ride} = K_{ride\_comp} \times \overline{v}^h, \text{ when } v_i < 0 \quad (8)$$

where $K_{ride\_reb}$, $K_{ride\_comp}$ are gains having predetermined values, respectively.

Figure 3:
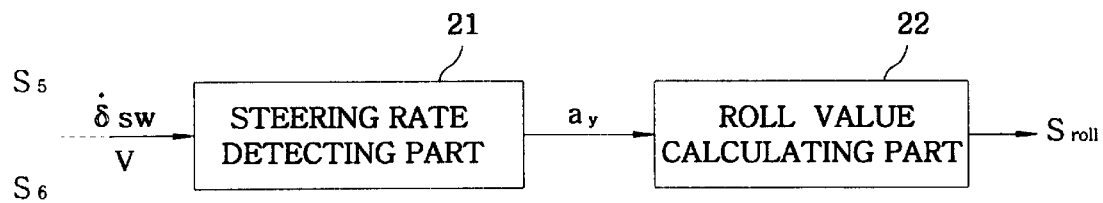
FIG. 3 describes a block diagram of the anti-roll control unit shown in FIG. 1.

As shown in FIG. 3, the anti-roll control part 20 includes a steering rate detecting part 21 and a roll value calculating part 22 and is electrically connected to a steering angle sensor S5 and a vehicle speed sensor S6.

First, signals detected by the sensors S5 and S6 are delivered into the steering rate detecting part 21.

A rolling velocity of a vehicle is proportional to a lateral acceleration of the vehicle and the lateral acceleration can be determined by using a steering angle displacement and a vehicular velocity of the vehicle. The lateral acceleration of the vehicle is determined as follows:

$$a_y = \frac{V^2}{l} \times \frac{1}{1 + \left(\frac{V}{V_{ch}}\right)^2} \times \frac{\dot{\delta}_{sw}}{i_s} \quad (9)$$

where $i_s$ is a steering gear ratio, $\dot{\delta}_{sw}$ a steering wheel angle ratio, l a length of wheel base, V a vehicular velocity and $V_{ch}$ a characteristic velocity of the vehicle.

Then, a time delay is taken into consideration for the lateral acceleration determined above as follows:

$$\frac{a_y^{delay}(z)}{a_y(z)} = \frac{0.01720z + 0.01720}{z - 0.96560} \quad (10z)$$

$$\frac{a_y^{delay}(s)}{a_y(s)} = \frac{1}{0.2s + 1} \quad (10s)$$

The roll value calculating part 22 calculates a roll value based on the lateral acceleration determined above as follows:

$$S_{roll} = |K_{roll} \cdot a_y^{relay}| \quad (11)$$

where $K_{roll}$ is a gain having a predetermined value.

Typically, $K_{roll}$ is a function of a slip ratio $\lambda$ and defined as follows:

$$\lambda = \frac{r^R \omega^R - r^F \omega^F}{r^R \omega^R} \quad (12)$$

where r is radius of a tire, $\omega$ a angular velocity of a tire and a superscript F stands for front and R for rear, which will be the same hereinafter.

The damping force adjusting unit 30 receives the ride value $S_{ride}$ and the roll value $S_{roll}$ and determines an operation value $S_i$. More specifically, when the roll value $S_{roll}$ is larger than 70, operation values $S_i$. For front and rear shock absorbers are determined as follows:

$$S_{iR}^F = S_{iC}^F = K_{roll}^F \cdot S_{roll} \quad (13F)$$

$$S_{iR}^R = S_{iC}^R = K_{roll}^R \cdot S_{roll} \quad (13R)$$

where a subscript R stands for rebound and C for compression, which will be the same hereinafter.

On the other hand, when the roll value is smaller than or equal to 70, the operation value $S_i$ is determined as follows:

$$S_i = v_i S_{ride} \quad (14)$$

This operation value $S_i$ will be larger than zero when the vertical velocity is upward and smaller than zero when the vertical velocity is downward. In order to realize the "sky-hook" control, the operation values for the front and rear shock absorber are determined as follows:

$$S_{iR} = S_i, \text{ when } S_i > 0 \quad (15)$$

$$S_{iC} = |S_i|, \text{ when } S_i < 0 \quad (16)$$

Finally, current amounts for the respective MR dampers are determined as follows:

$$A_R = 3 \cdot \frac{S_{iR}}{128} \quad (17)$$

$$A_C = 3 \cdot \frac{S_{iC}}{128} \quad (18)$$

where A is an amount of control current for the valves of the MR dampers.

When the operation values $S_{iR}$ or $S_{iC}$ are greater than 128, the currents are set as follows:

$$A_R = 3 \quad (19)$$

$$A_C = 3 \quad (20)$$

These currents are delivered to the rebound valve and the compression valve of MR dampers and damping force characteristics of each MR damper are controlled independently.

In the apparatus in accordance with the present invention, damping force characteristics are varied continuously and can be controlled independently in rebound strokes and compression strokes, respectively. Further, response times are fast enough to realize the required ride comfort and anti-roll control. Furthermore, an optimal contacting state of a vehicle can be established when the inventive apparatus is used with an anti-lock braking system (ABS) and the like.

Although the invention has been shown and described with respect to the preferred embodiments, it will be understood by those skilled in the art that various changes and modifications may be made without departing from the spirit and scope of the invention as defined in the following claims.

What is claimed is:

1. An apparatus for controlling a semi-active suspension system of a vehicle including at least one shock absorber using magneto-rheological fluids, the shock absorber having a rebound valve and a compression valve which are configured such that damping forces of the shock absorber generated in rebound strokes and compression strokes are controlled independently of each other, the apparatus comprising:

a normal driving control unit for determining a ride value ($S_{ride}$) and a filtered vehicular vertical velocity ($v_i$) based on a vehicular vertical acceleration;

an anti-roll control unit for determining a roll value ($S_{roll}$) based on a velocity and a steering angle of the vehicle; and a damping force adjusting unit for controlling the rebound valve and the compression valve of the shock absorber based on the roll value ($S_{roll}$), the ride value ($S_{ride}$) and the filtered vehicular vertical velocity ($v_i$) under a predetermined condition.

2. The apparatus of claim 1, wherein the normal driving control unit includes an integrator for determining a vehicular vertical velocity ($v^h$) by integrating the vehicular vertical acceleration (a) detected by an acceleration sensor, a filtering part for determining the filtered vertical velocity ($v_i$) based on the vehicular vertical acceleration (a) and the vehicular vertical velocity ($v^h$) and a ride value calculating part for calculating the ride value ($S_{ride}$) based on the vehicular vertical velocity ($v^h$) and the filtered vertical velocity ($v^i$).

3. The apparatus of claim 2, wherein the integration operation of the integrator is performed such that the following equation holds:

$$\frac{v^h(z)}{a(z)} = \frac{0.00345 z^2 - 0.00345}{z^2 - 1.969 z + 0.96968}$$

wherein a(s) is the vertical vehicular acceleration, and $v^h(s)$ is the vehicular vertical velocity.

4. The apparatus of claim 2, wherein the filtered vertical velocity ($v_i$) is determined such that the following equations hold:

$$\frac{a^{10Hz}(z)}{a(z)} = \frac{0.11179 z^2 - 0.11179}{z^2 - 1.6125 z + 0.77642}$$

$$a_{sq}^{10Hz}(z) = (a^{10Hz}(z))^2$$

$$\frac{\overline{a}_{sq}^{10Hz}(z)}{a_{sq}^{10Hz}(z)} = \frac{0.06195 z + 0.06195}{z - 0.87611}$$

$$v_i = \frac{v^h}{1 + K_v \cdot \overline{a}_{sq}^{10Hz}}$$

wherein $K_v$ is a gain having a predetermined value.

5. The apparatus of claim 2, wherein the ride value ($S_{ride}$) is calculated such that the following equations hold:

$$S_{ride} = K_{ride\_reb} \times \overline{v}^h, \text{ when } v_i > 0$$

$$S_{ride} = K_{ride\_comp} \times \overline{v}^h, \text{ when } v_i < 0$$

wherein $K_{ride\_reb}$, $K_{ride\_comp}$ are gains having predetermined values, and $$\frac{\overline{v}^h(z)}{v_p(z)} = \frac{0.01065 z + 0.01065}{z - 0.97869}, \text{ with } v_p(z) = |v^h(z)|.$$

6. The apparatus of claim 2, wherein the integration operation of the integrator is performed such that the following equation holds:

$$\frac{v^h(s)}{a(s)} = \frac{s}{s^2 + 2\zeta_1 \omega_1 s + \omega_1^2}$$

wherein a(s) is the vertical acceleration, and $v^h(s)$ is the vehicular vertical velocity.

7. The apparatus of claim 2, wherein the filtered vertical velocity ($v_i$) is determined such that the following equations hold:

$$\frac{a^{10\ Hz}(s)}{a(s)} = \frac{2\zeta_2 \omega_2 s}{s^2 + 2\zeta_2 \omega_2 s + \omega_2^2}, \zeta_2 = 0.3, \omega_2 = 10 \times 2\pi$$

$$a_{sq}^{10\ Hz}(s) = (a^{10\ Hz}(s))^2$$

$$\frac{\overline{a}_{sq}^{10\ Hz}(z)}{a_{sq}^{10\ Hz}(z)} = \frac{1}{Ts + 1}, T = 0.053$$

-continued $$v_i = \frac{v^h}{1 + K_v \cdot a_{sq}^{10\ Hz}}$$

wherein $K_v$ is a gain having a predetermined value.

8. The apparatus of claim 2, wherein the ride value ($S_{ride}$) is calculated such that the following equations hold:

$$S_{ride} = K_{ride\_reb} \cdot \bar{v}^h, \text{ when } v_i > 0$$

$$S_{ride} = K_{ride\_comp} \times \bar{v}^h, \text{ when } v_i < 0$$

wherein $$\frac{\bar{v}^h(s)}{v_p(s)} = \frac{1}{Ts+1}, T = 0.325, \text{ where } v_p(s) = |v^h(s)|.$$

9. The apparatus of claim 1, wherein the anti-roll control part includes a steering rate detecting part for determining a lateral acceleration ($a_y$) based on the velocity and the steering angle of the vehicle and a roll value calculating part for determining the roll value ($S_{roll}$) based on the lateral acceleration ($a_y$).

10. The apparatus of claim 9, wherein the lateral acceleration ($a_y$) is determined such that the following equation holds:

$$a_y = \frac{V^2}{l} \times \frac{1}{1 + \left(\frac{V}{V_{ch}}\right)^2} \times \frac{\delta_{sw}}{i_s}$$

wherein $i_s$ is a steering gear ratio, $\delta_{sw}$ is a steering wheel angle ratio, l is a length of wheel base, V is a vehicular velocity, and $V_{ch}$ is a characteristic velocity.

11. The apparatus of claim 9, wherein the roll value ($S_{roll}$) is calculated such that the following equation holds:

$$S_{roll} = |K_{roll} \cdot a_y^{delay}|$$

wherein $$\frac{a_y^{delay}(z)}{a_y(z)} = \frac{0.01720z + 0.01720}{z - 0.96560}.$$

12. The apparatus of claim 9, wherein the roll value ($S_{roll}$) is calculated such that the following equation holds:

$$S_{roll} = |K_{roll} \cdot a_y^{delay}|$$

wherein $$\frac{a_y^{delay}(s)}{a_y(s)} = \frac{1}{0.2s + 1}.$$

13. The apparatus of claim 1, wherein, when the roll value ($S_{roll}$) is larger than a predetermined value, an amount of control current for the rebound valve ($A_R$) and that for the compression valve ($A_C$) of the shock absorber are determined such that the following equations hold:

$$A_R = 3 \cdot \frac{S_{iR}}{128}$$

$$A_C = 3 \cdot \frac{S_{iC}}{128}$$

wherein the subscript R stands for rebound and the subscript C for compression, $$S_{iR}^F = S_{iC}^F = K_{roll}^F \cdot S_{roll}, \text{ and}$$

$$S_{iR}^R = S_{iC}^R = K_{roll}^R \cdot S_{roll}$$

where the superscript F stands for front and the superscript R for rear.

14. The apparatus of claim 13, wherein, when $S_{iR}$ is greater than 128, the amount of control current for the rebound valve ($A_R$) has a value of 3.

15. The apparatus of claim 13, wherein, when $S_{iC}$ is greater than 128, the amount of control current for the compression valve ($A_C$) has a value of 3.

16. The apparatus of claim 1, wherein, when the roll value ($S_{roll}$) is smaller than a predetermined value, an amount of control current for the rebound valve ($A_R$) and that for the compression valve ($A_C$) of the shock absorber are determined by the damping force adjusting unit such that the following equations hold:

$$A_R = 3 \cdot \frac{S_{iR}}{128}$$

$$A_C = 3 \cdot \frac{S_{iC}}{128}$$

wherein the subscript R stands for rebound and the subscript C for compression and $$S_i = v_i \cdot S_{ride}$$

$$S_{iR} = S_i, \text{ when } S_i > 0, \text{ and}$$

$$S_{iC} = |S_i|, \text{ when } S_i < 0.$$

17. The apparatus of claim 16, wherein, when $S_{iR}$ is greater than 128, the amount of control current for the rebound valve ($A_R$) has a value of 3.

18. The apparatus of claim 16, wherein, when $S_{iC}$ is greater than 128, the amount of control current for the compression valve ($A_C$) has a value of 3.

* * * * *